Dec. 31, 1940.  LE ROY J. JEFFRIES  2,226,819

METHOD OF MAKING ADJUSTABLE JOINTS

Filed March 6, 1939

INVENTOR.
LE ROY J. JEFFRIES
BY McConkey Dawson & Booth
ATTORNEYS.

Patented Dec. 31, 1940

2,226,819

UNITED STATES PATENT OFFICE 2,226,819

METHOD OF MAKING ADJUSTABLE JOINTS

Le Roy J. Jeffries, Elkhart, Ind., assignor to C. G. Conn Ltd., Elkhart, Ind., a corporation of Indiana Application March 6, 1939, Serial No. 260,120

2 Claims. (Cl. 29—148)

This invention relates to method of making adjustable joints and more particularly to joints which may be locked in any desired position.

One of the objects of the invention is to provide a method of making an adjustable pivotal joint which can be securely locked in any desired position without putting a heavy load on the pivot. According to one feature of the invention the pivotally connected members are formed with interfitting parts generally concentric with the pivotal axis and which lock the parts against pivotal movement.

Another object of the invention is to provide a method of making adjustable joints by partially shearing members to be connected to form interfitting projections and recesses therein.

Still another object of the invention relates to a simple and inexpensive method of forming a joint requiring only a single shearing operation.

The above and other objects, advantages and novel features of the invention will be apparent from the following description when read in connection with the accompanying drawing, in which.

Figure 1:
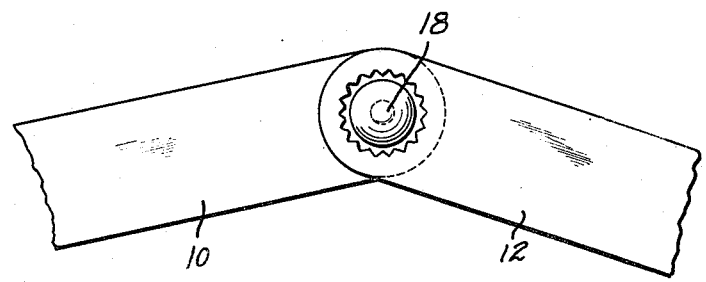
Figure 1 is a front view of a joint embodying the invention.

As shown the joint is formed between a pair of rods or strips 10 and 12 having flat end portions at the point of connection. Holes 14 and 16 are formed in the members 10 and 12 respectively to receive a bolt 18 having a wing nut 20 threaded thereon, the bolt forming a pivotal connection betwen the members. If desired, the hole 16 may be made square as shown to receive a corresponding squared portion on the bolt to prevent it from turning.

Each of the members 10 and 12 is formed with an offset portion 22 to provide a cavity 24 on one side of the member and a projection 26 on the other side. The cavity and projection are shown as being generally cylindrical and concentric with openings 12 and 14 and having serrated side walls. While relatively fine serrations have been shown it will be apparent that they might be made finer or coarser depending upon the fineness of adjustment desired.

Figure 2:
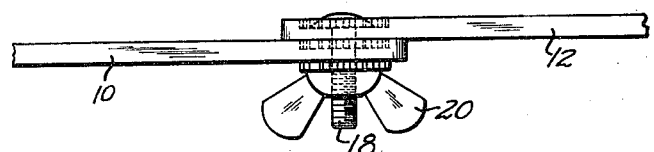
Figure 2 is a side view.
Figure 3:
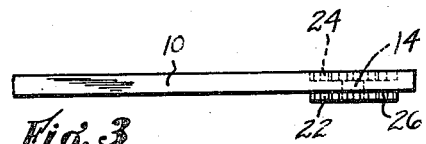
Figures 3 and 4 are side and front views respectively of one of the joint members.
Figure 5:
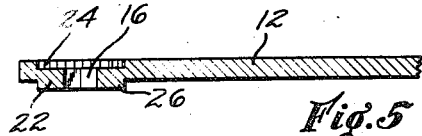
Figures 5 and 6 are sectional and front views respectively of the other joint member.
Figure 4:
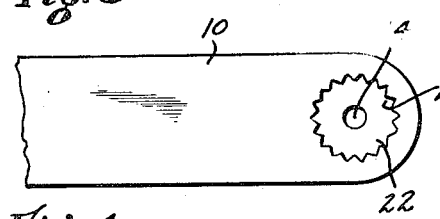
Figure 6:
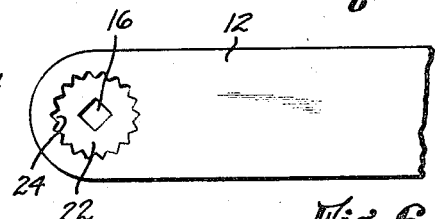

When the members are assembled as shown in Figures 1 and 2 the projection on one member fits into the cavity in the other and the serrations interlock so that relative pivotal movement is prevented. It will be noted that the offset portions of the members hold them in the proper relative positions and that the only function of the nut 20 is to prevent the members from moving apart axially of the bolt. To change the adjustment, the bolt 20 may be loosened so that the projection on the one member may move out of the cavity in the other. The members may then be pivoted to any desired new position and will be relocked when the bolt is tightened.

Figure 7:
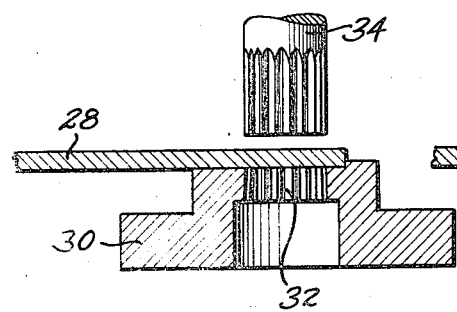
Figures 7 and 8 are partial sectional views illustrating a method of making the joint members.
Figure 8:
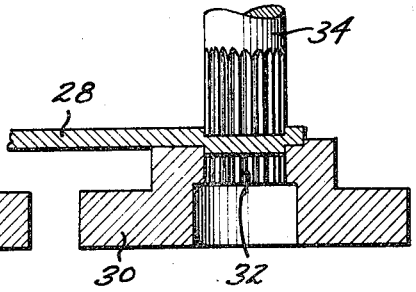

Figures 7 and 8 illustrate one desirable method of forming the joint members. As shown, a strip of steel or the like 28, which may be plated if desired, is placed in a die 30 formed with a serrated opening 32. A punch 34 having correspondingly serrated sides is then pressed into the strip to the desired depth partially to shear the metal and to offset a portion thereof into the die opening 32. This provides a cavity such as 24 on one side of the strip and a projection such as 26 on the other side thereof, both the cavity and projection having smooth face surfaces and serrated side walls.

While one joint and one method of forming it have been illustrated and described in detail, it will be understood that various changes might be made therein and it is not intended to limit the scope of the invention by the illustration and description nor otherwise than by the terms of the appended claims.

What is claimed is:

1. The method of forming adjustable joints which comprises forming a flat metallic member and partially shearing portions of the metal a distance insufficient to separate the sheared portion from the member to simultaneously form a projection and a recess on opposite sides of the member having substantially perpendicular side walls such that the recess of one such member will fit over the projection of another such member, and simultaneously forming the projection and recess with parts which interlock when the recess of one member is so fitted over the projection of another, and arranging said parts so that they may be interlocked in a plurality of adjusted positions.

2. The method of forming adjustable joints which comprises forming at least two flat metallic members so that they may be interlocked in several adjusted positions by the process of shearing a portion of the metal of each member a distance insufficient to separate the sheared portion from the member to simultaneously form a projection and a recess on opposite sides of the member each of which has side walls substantially perpendicular to the face of the member and each of which is capable of interfitting with the formed portion of opposite kind on the other member.

LE ROY J. JEFFRIES.